United States Patent
Bucheit et al.

(10) Patent No.: US 7,822,166 B2
(45) Date of Patent: Oct. 26, 2010

(54) FUEL ASSEMBLY FOR A BOILING WATER REACTOR

(75) Inventors: Peter Bucheit, Herzogenaurach (DE); Hans-Peter Fuchs, Nürnberg (DE); Matthias Rudolf, Weisendorf (DE)

(73) Assignee: Areva NP GmbH, Erlangen (DE)

( * ) Notice: Subject to any disclaimer, the term of this patent is extended or adjusted under 35 U.S.C. 154(b) by 0 days.

(21) Appl. No.: 11/097,077

(22) Filed: Apr. 1, 2005

(65) Prior Publication Data
US 2005/0243961 A1    Nov. 3, 2005

Related U.S. Application Data

(63) Continuation of application No. PCT/EP2003/009209, filed on Aug. 20, 2003.

(30) Foreign Application Priority Data
Oct. 1, 2002    (DE) ................. 102 46 131

(51) Int. Cl.
*G21C 3/32* (2006.01)
(52) U.S. Cl. .............. 376/438; 376/435; 376/442; 376/448; 376/449
(58) Field of Classification Search ............ 376/435, 376/438, 442, 448, 449
See application file for complete search history.

(56) References Cited

U.S. PATENT DOCUMENTS

| | | | |
|---|---|---|---|
| 4,585,616 A * | 4/1986 | DeMario et al. ........ 376/442 |
| 4,588,550 A * | 5/1986 | Blomstrand et al. ..... 376/438 |
| 5,178,825 A | 1/1993 | Johansson |
| 5,183,629 A * | 2/1993 | Canat et al. .......... 376/439 |
| 5,253,278 A | 10/1993 | Kanazawa et al. |
| 5,267,286 A * | 11/1993 | Hirukawa ............. 376/353 |
| 5,267,291 A | 11/1993 | Matzner et al. |
| 6,516,043 B1 | 2/2003 | Chaki et al. |
| 6,519,309 B1 * | 2/2003 | Van Swam ............ 376/442 |
| 6,600,800 B2 | 7/2003 | Bender et al. |
| 2002/0075987 A1 * | 6/2002 | Bender et al. ......... 376/435 |

FOREIGN PATENT DOCUMENTS

JP    2000-193774    7/2000
WO    0038194    6/2000

* cited by examiner

*Primary Examiner*—Johannes P Mondt
(74) *Attorney, Agent, or Firm*—Laurence A. Greenberg; Werner H. Stemer; Ralph E. Locher

(57) ABSTRACT

A fuel assembly for a boiling water reactor contains a plurality of fuel rods maintained laterally by spacers and surrounded by a fuel assembly case. The outer walls of a spacer are provided with projecting elements that maintain a minimum space between the outer surface of the spacer and the fuel assembly case, the opening span of a spacer being smaller than the internal width of the fuel assembly case. The fuel assembly is characterized in that the spacer is maintained in an off-center position by a force acting laterally thereon such that an external space located between an outer surface of the spacer associated with the outer surface of a central cell and the fuel assembly case is narrower than an internal gap opposite the external space and oriented towards the center or towards a control element disposed at the center.

7 Claims, 2 Drawing Sheets

FUEL ASSEMBLY FOR A BOILING WATER REACTOR

CROSS-REFERENCE TO RELATED APPLICATION

This is a continuation, under 35 U.S.C. §120, of copending international application No. PCT/EP2003/009209, filed Aug. 20, 2003, which designated the United States; this application also claims the priority, under 35 U.S.C. §119, of German patent application No. 102 46 131.7, filed Oct. 1, 2002; the prior applications are herewith incorporated by reference in their entirety.

BACKGROUND OF THE INVENTION

Field of the Invention

The invention relates to a fuel assembly for a boiling water reactor. Such a fuel assembly contains a bundle of fuel rods held laterally by spacers and surrounded by a fuel assembly case. There is a foot part at its bottom end, and a top part at its top end. Between the outer side of the spacers and an inner side of the fuel assembly case there is a gap, in order that fuel rods at the edge can also be supplied with cooling water during operation. Studs project from the outer side of the spacers. The width across flats of such a spacer, that is to say its width measured over the studs, is less than the clearance width of the fuel assembly. For reasons of neutron economy, fuel rods, spacers and the fuel assembly case are fabricated from zirconium alloys. Components of zirconium alloys whose texture factor differs from 0.33 exhibit growth during the reactor operation corresponding to the texture (for example as a result of irradiation with neutrons, corrosion influences and so on), which in the case of spacers has the effect that their width across flats increases during use in the reactor. In order to permit disassembly without difficulty in the event of service, the neutron-induced growth is compensated for by a corresponding reduction in the width across flats of the spacers. In the case of a new fuel assembly, there is thus a relatively large gap between the fuel assembly case and the fuel rods and the spacers of a bundle of fuel rods. Added to this is the fact that the central regions of the fuel assembly case, remote from the foot and top part, widen permanently under the temperatures and pressures prevailing during operation, which can be attributed to radiation-induced creep of the zirconium material. The gap present between the spacers and an inner side of the fuel assembly case in the installed state will therefore initially become larger still during operation. Thus, for example on account of different flow conditions, a fuel assembly can deflect laterally and, as a result, come close to an inner side of the fuel assembly case, which results in that the gap assigned to the inner side decreases but the opposite gap is enlarged. The consequence is a change in the thermohydraulic conditions in the region of the relevant fuel rods close to the edge. In the case of the fuel assembly disclosed by U.S. Pat. No. 5,267,291, this is to be prevented as follows: on two mutually adjacent edge webs of the spacers there are studs which project less farther from their outer side than the studs of the respective other two edge webs. In addition, spring elements are fitted to the outer side of the first-mentioned edge webs, are supported on the fuel assembly case and center the fuel assembly therein. Accordingly, the aforementioned gaps all have the same width.

SUMMARY OF THE INVENTION

It is accordingly an object of the invention to provide a fuel assembly for a boiling water reactor that overcomes the above-mentioned disadvantages of the prior art devices of this general type, which ensures defined mounting in a fuel assembly case and which is improved from a thermohydraulic point of view.

With the foregoing and other objects in view there is provided, in accordance with the invention, a fuel assembly for a boiling water reactor. The fuel assembly contains a spacer for laterally holding a bundle of fuel rods, and the spacer has outer walls and flats. A fuel assembly case surrounds the spacer, a width across the flats of the spacer being smaller than a clearance width of the fuel assembly case. Studs project from the outer walls of the spacer and ensure an outer gap between a respective outer wall of the spacer and the fuel assembly case. The spacer is held in an off-center position by a force acting laterally on the spacer such that the outer gap present between the respective outer wall of the spacer assigned to an outer side of a core cell and the fuel assembly case is narrower than an inner gap formed opposite the outer gap and facing a center of the core cell having a control element in the center.

The object is achieved in that a spacer is held in an off-center position by a force acting laterally on it or on a fuel assembly such that the outer gap which is present between an outer side of the spacer assigned to the outer side of a core cell and the fuel assembly case is narrower than a gap opposite the gap and facing the center or a control element present there. This ensures that, in the region of a spacer, there are gaps which are defined and can be calculated in advance and which do not change in an unpredictable manner during reactor operation.

A core cell is a configuration of four fuel assemblies between which a control element with a cross-shaped cross section is disposed. The fuel rods adjacent to the control element have a higher power density, because of the quantity of water or moderator, which is higher there, than the fuel rods assigned to the outer side of a core cell. They are therefore normally less enriched than the fuel rods on the outer side. By the off-center position according to the invention of the fuel assembly in the fuel assembly case, the cooling in the region of an inner gap is improved by enlarging the cooling cross section, and thus the margin from the boiling transition power (MASL) is increased. In the case of the fuel rods of lower power density located on the outside, although there is a reduction in the coolant throughput, this can be compensated for by an optimized enrichment distribution.

The force, which maintains a bundle of fuel rods in it's off-center position is preferably applied by spring elements. However, it is also conceivable for the force to be produced by flow-induced pressure differences. In a preferred embodiment, the spring elements are provided on an outer side of the spacer assigned to an inner gap. This ensures that the opposite outer side of the spacer can come closer to the fuel assembly case than if spring elements, for example like those in a fuel assembly according to U.S. Pat. No. 5,267,291, were to be arranged there.

In accordance with a preferred embodiment of the invention, the outer gap contains two outer gaps and both of the outer gaps are narrower than the inner gap formed of two inner gaps.

Other features which are considered as characteristic for the invention are set forth in the appended claims.

Although the invention is illustrated and described herein as embodied in a fuel assembly for a boiling water reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
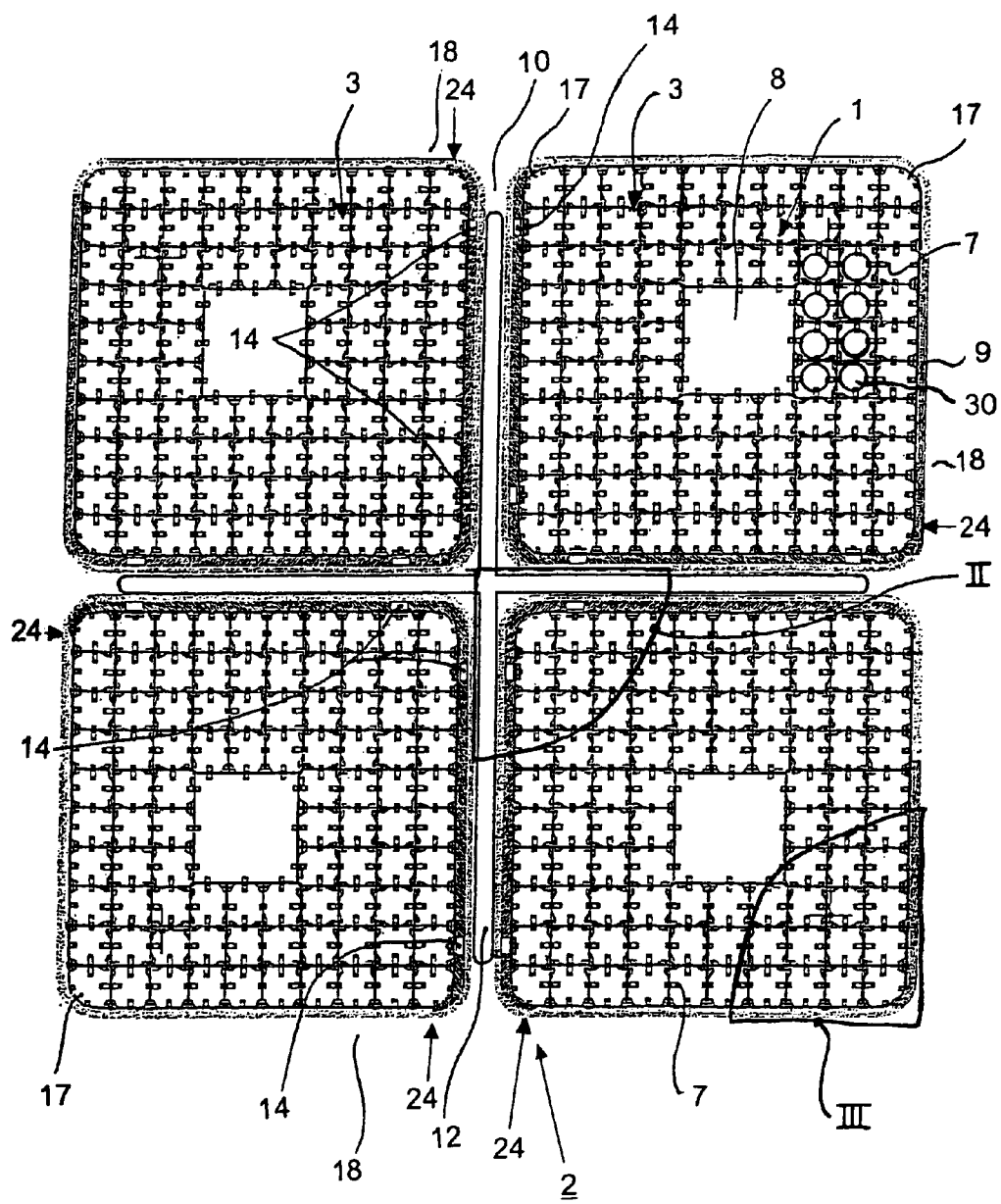
FIG. 1 is a diagrammatic, plan view of a core cell containing four fuel elements and a control element.

Referring now to the figures of the drawing in detail and first, particularly, to FIG. 1 thereof, there is shown a pressure vessel of a boiling water reactor. In each case groups of four fuel assemblies 1 are combined to form a core cell 2. In the figures, for illustrative reasons, only a spacer 3 of one bundle of fuel rods are illustrated; the water channel and fuel rods have been left out. The overall shape of the spacer 3 is in principle arbitrary. In the exemplary embodiment shown, however, the spacer 3 is composed of longitudinal and transverse webs 4, 5 plugged into one another and edge webs 6a-d surrounding the latter. On the longitudinal and transverse webs 4, 5 there are spring elements 7 used to hold fuel rods 30 of which only a few fuel rods 30 are illustrated in FIG. 1. In addition, the spacer 3 has an opening 8 which is disposed off-center and through which a water channel passes. A bundle of fuel rods with its spacer 3 is surrounded by a fuel assembly case 9. The bundle of fuel rods of the core cell 2 is disposed such that their centers or the centers of the spacers 3 respectively assigned to them lie approximately at the corners of a square. Between the bundles of fuel rods and the spacers 3 located at the same vertical level there is an interspace 10, which accommodates a control element 12 of cross-shaped cross section. Between the control element 12 and the fuel assembly case 9 adjacent to it there is a space 13. The inner edge webs 6a, 6b and those adjacent to the control element 12 are provided with, for example, two spring elements 14, which extend away from the outer side 15a of the edge webs 6a, 6b (see FIG. 2). The spring elements 14 are supported against an inner side 16 of the fuel assembly casing 9. The two spring elements 14 of an edge web 6a, 6b are in each case disposed close to a corner 17 of the spacer 3. On the two outer edge webs 6c, 6d, which are assigned to an outer side 18 of a core cell, there are no spring elements, instead only studs 19 on the outside (see FIG. 3). The spring elements 14 press the spacer 3 away from the inner side 16 of the fuel element case 9, in each case with a force extending transversely with respect to the corresponding edge web 6a, 6b. This results in a force component acting diagonally on the spacer 3 in the direction of arrow 20. The result of the force action is that the edge webs 6c, 6d that are free of the spring elements are pressed with their studs 19 against the inner side 16 of the fuel element case 9. Because of the studs, which project from the outer side of the edge webs 6c, 6d, there is a narrow gap 22 between these and the fuel assembly case 9. By contrast, a gap 23 between the outer edge webs 6a, 6b and the fuel assembly case 9 is substantially larger. As compared with a central configuration of the spacer in the fuel assembly case 9, implemented for example by spring elements distributed around the circumference of the spacer 3, in the configuration according to the invention there is a relatively large gap 23 and therefore intensified cooling at the location of greater power density, that is to say for example the rows of fuel rods 24 immediately adjacent to the control element 12.

This application claims the priority, under 35 U.S.C. §119, of German patent application No. 102 46 131.7, filed Oct. 1, 2002; the entire disclosure of the prior application is herewith incorporated by reference.

Figure 2:
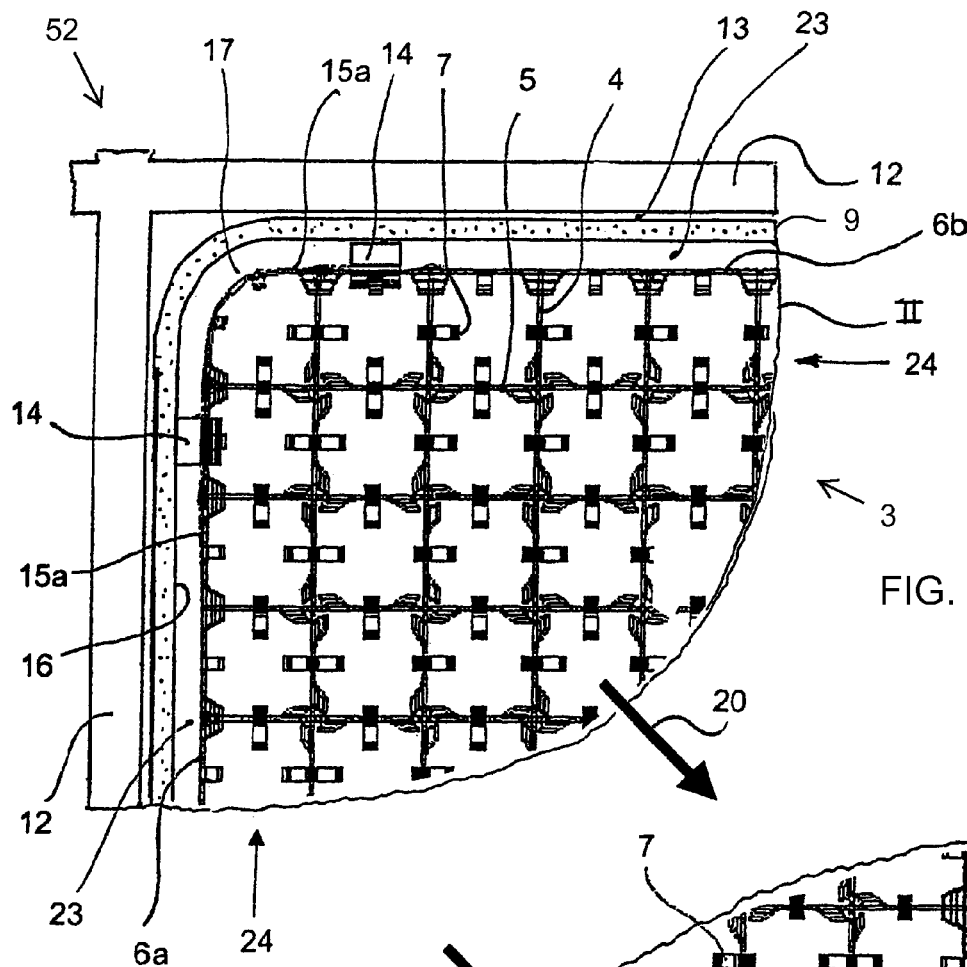
FIG. 2 is a diagrammatic, enlarged, partial plan view of detail II shown in FIG. 1.
Figure 3:
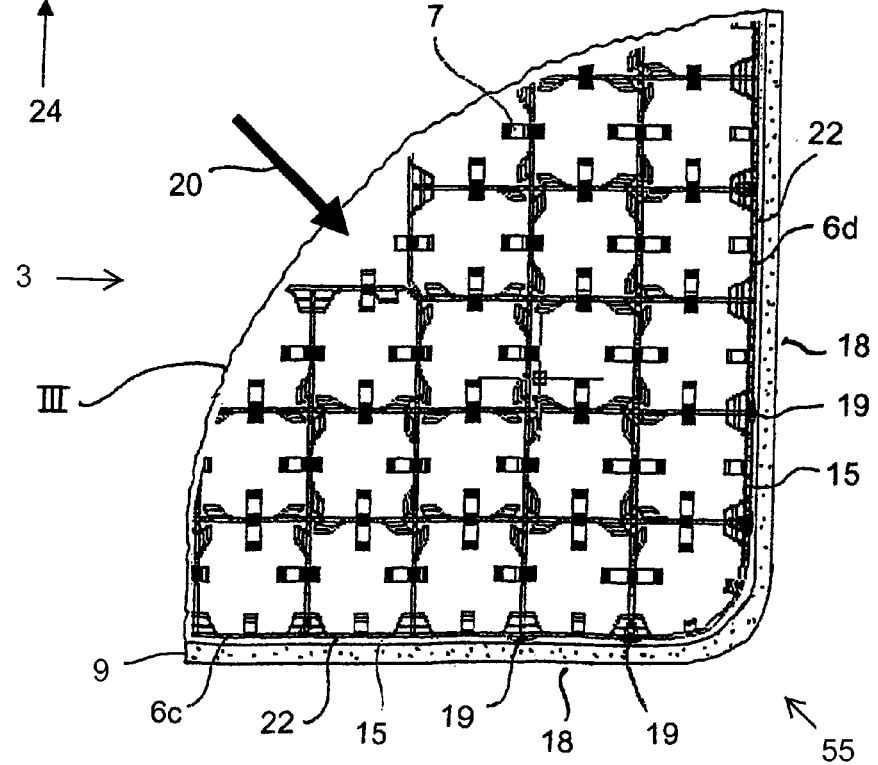
FIG. 3 is a diagrammatic, enlarged, partial plan view of detail III shown in FIG. 1.

Referring to FIG. 2, it can be seen that the inner edge webs 6a and 6b of the spacer 3 are adjacent the inner region 52 of the core cell 2. The gap 23 between the inner edge webs 6a, 6b and the fuel assembly case 9 extends at least from one of the spring elements 14 to another one of the spring elements 14. The inner edge webs 6a, 6b are adjacent the control element 12 and the interspace 10 that accommodates the control element 12. The two outer edge webs 6c, 6d are remote from the control element 12. Referring to FIG. 3, it can be seen that the outer edge webs 6c and 6d are adjacent the outer region 55 of the core cell 2.

We claim:

1. A fuel assembly, comprising:
a fuel element case for a boiling water reactor;
a spacer for laterally holding a bundle of fuel rods, said fuel element case surrounding said spacer, said spacer including two inner edge webs and two outer edge webs, said two inner edge webs being adjacent an interspace for a control element;
an inner gap formed between said two inner web edges and said fuel element case, said inner gap extending substantially along said two inner web edges;
an outer gap formed between said two outer web edges and said fuel element case, said outer gap extending substantially along said outer web edges;
spring elements extending away from said two inner edge webs and into said inner gap, said spring elements supported against said fuel element case, said spring elements holding said spacer held in an off-center position such that said outer gap is narrower than said inner gap; and
studs projecting from said outer edge webs and into said outer gap, said studs ensuring that said outer gap maintains a minimum dimension.

2. The fuel assembly according to claim 1 wherein said spring elements include a first spring element and a second spring element, and said inner gap extends at least from said first spring element to said second spring element.

3. The fuel assembly according to claim 1, wherein said spacer has a corner, and at least one of said spring elements is disposed adjacent said corner of said spacer.

4. The fuel assembly according to claim 1, wherein said fuel element case has inner sides, and said spring elements press said spacer away from said inner sides of said fuel element case with a force extending transversely with respect to a corresponding one of said inner edge webs.

5. The fuel assembly according to claim 1, further comprising a control element disposed in the interspace.

6. The fuel assembly according to claim 1, wherein each of said inner web edges has a total length, and said inner gap extends along said total length of said inner web edges.

7. A core cell for a boiling water reactor, the core cell having four fuel elements, and a control element disposed between said four fuel elements, each one of said four fuel elements comprising:

a fuel element case for a boiling water reactor;

a spacer for laterally holding a bundle of fuel rods, said fuel element case surrounding said spacer, said spacer including two inner edge webs and two outer edge webs, said two inner edge webs being adjacent the control element, said two outer edge webs being remote from the control element;

an inner gap formed between said two inner web edges and said fuel element case, said inner gap extending substantially along said two inner web edges;

an outer gap formed between said two outer web edges and said fuel element case, said outer gap extending substantially along said outer web edges;

spring elements extending away from said two inner edge webs and into said inner gap, said spring elements supported against said fuel element case, said spring elements holding said spacer held in an off-center position such that said outer gap is narrower than said inner gap; and studs projecting from said outer edge webs and into said outer gap, said studs ensuring that said outer gap maintains a minimum dimension.

* * * * *